United States Patent Office 2,834,760
Patented May 13, 1958

2,834,760
REDOX TYPE POLYMERIZATION

Robert J. Orr and Harry Leverne Williams, Sarnia, Ontario, Canada, assignors to Polymer Corporation Limited, Sarnia, Ontario, Canada, a corporation of Canada No Drawing. Application January 31, 1955
Serial No. 485,296

Claims priority, application Canada December 14, 1954

7 Claims. (Cl. 260—82.5)

This invention relates to low temperature redox type polymerization of conjugated diolefins containing from 4 to 12 carbon atoms. Such polymerization includes straight polymerization of the diolefins themselves or copolymerization of the diolefins with copolymerizable compounds.

Low temperature polymerization, e. g., below 20° C., is now preferred to polymerizations taking place at elevated temperatures because the resultant polymers have superior physical properties. The reactions are of the redox type, and hence the polymerization formula contains an oxidizing agent, a reducing agent and an oxidation catalyst.

The oxidizing agent is usually a peroxide or a hydroperoxide. Suitable oxidants would be inorganic peroxides such as hydrogen peroxide, a pernitrate, a persulfate and a permanganate, or organic peroxides such as benzoyl peroxide, or organic hydroperoxides such as tertiary butyl cumene hydroperoxide, methylcyclohexyl hydroperoxide, cumene hydroperoxide and diisopropylbenzene hydroperoxide. As oxidation catalysts, there are used compounds of a multivalent metal in such a condition that it can change its valence state reversibly. The compounds normally used are those of metals such as iron, cobalt, nickel, manganese or copper. The reducing agent normally used is an easily oxidizable organic compond, such as a reducing sugar. Sodium formaldehyde sulfoxylate has recently come into wide-spread use for this purpose.

In the usual redox system, for example with ferrous iron oxidation catalyst and a monohydroperoxide oxidizing agent, the polymerization of the monomers is initiated by a reaction between a complex of the ferrous iron and the monohydroperoxide resulting in the release of free radicals. (A free radical is defined as an unsaturated molecular fragment in which some of the valence electrons remain free, that is, do not partake in bonding.) These free radicals then cause the polymerization.

However, it has been found that most of the hydroperoxides used suffer from a number of defects when used according to this scheme. It has been found that at low temperatures some hydroperoxides do not react satisfactorily with the complex of ferrous iron so that an inadequate amount of free radicals are produced. In other cases the hydroperoxides decompose at higher temperature so that the free radicals are produced too abundantly. These free radicals do not effect polymerization, but react with themselves until all the hydroperoxide is used up.

Even in cases where the release of free radicals from the hydroperoxide is adequate, other factors come into play to cause unsatisfactory results. There are side reactions which tend to have an adverse effect on the polymerization. There are four ways in which these free radicals may react: they may react the preferred way causing polymerization of the monomer; they may react with themselves thus depleting the supply; they may react with the ferrous iron oxidation catalyst; or they may react with the parent hydroperoxide. In the last three cases the polymerization is reduced due to the wastage of free radicals.

There are a number of means of reducing the wastage, but all of them include the imposition of fairly rigid and expensive requirements on the polymerization formula. These means include the use of an emulsifying agent. This brings appreciable amounts of the monomers into the aqueous phase and hence increases the chance of collisions between free radicals and monomer molecules which cause reaction.

The attack of the free radicals on the ferrous iron can be minimized by keeping the ferrous iron concentration low relative to the monomer concentration in the aqueous phase. This may be accomplished by the use of an expensive sequestering agent. (A sequestering agent is defined as a substance which forms a complex compound, complex ion or other aggregate with a metal or a metallic compound, commonly with a metallic ion, and thereby modifies the action of the ion or compound. Many, but not all, sequestering agents owe their action to the formation of chelate compounds.) Some examples of sequestering agents are ethylenediaminetetraacetic acid and its sodium salts, tripolyphosphates, citrates, or potassium pyrophosphate. The product of the sequestering agent and the ferrous iron has a very low dissociation constant and, therefore, permits only a small quantity of ferrous iron to be present in the ionized state.

It has now been discovered that the difficulties inherent in the above described redox type reactions may be overcome by using diisopropylbenzene dihydroperoxide as the oxidizing agent. It is preferable that at least 0.01 part of this dihydroperoxide be used per 100 parts by weight of the polymerizable starting materials. The upper limit is not theoretically critical, but it is undesirable to have free dihydroperoxide in the final product. Thus 0.5 part is a suitable upper limit for the dihydroperoxide.

An indication of the relative efficiency of diisopropylbenzene dihydroperoxide as compared with other peroxide oxidizing agents may be seen by a comparison of relative reaction rates. If we let $k_1$ be the asbolute reaction rate of the free radical towards the ferrous iron, $k_2$ be the absolute reaction rate of the free radical on the monomer, and $k_3$ be the absolute reaction rate of the free radical towards the peroxide, we may obtain two very useful relative reaction rates. (The method of determination of these three absolute reaction rate constants is being currently submitted to the Journal of the American Chemical Society in an article by Orr and Williams.)

We may let $$K_1 = \frac{k_2}{k_1} \text{ and } K_2 = \frac{k_2}{k_3}$$

Thus $K_1$ gives an indication of the preference of attack by free radicals on the monomer rather than to its attack on ferrous iron, and $K_2$ gives an indication of the preference of attack by free radicals on the monomer rather than the attack on the peroxide.

It can be seen that higher values for $K_1$ and $K_2$ indicate a greater probability that polymerization will take place.

A comparison of the relative reaction rate constants for various peroxide oxidizing agents in the polymerization of acrylonitrile is given below in Table I. The temperatures, in degrees C. at which the values were determined, are shown in brackets.

TABLE I

| Peroxide | $K_1$ | $K_2$ |
|---|---|---|
| p-nitrocumene hydroperoxide | $1 \times 10^{-2}$ (40) | $1 \times 10^{-2}$ (40) |
| cumene hydroperoxide | $1.3 \times 10^{-3}$ (25) | $6.5 \times 10^{-3}$ (25) |
| p-tert-butyl cumene hydroperoxide | $1.1 \times 10^{-2}$ (20) | $5.5 \times 10^{-2}$ (20) |
| diisopropylbenzene dihydroperoxide | $8 \times 10^{-1}$ (40) | $8 \times 10^{-2}$ (40) |
| | 4.0 (25) | 1.0 (25) |

It can be seen that the values of $K_1$ and $K_2$ are very much higher for diisopropylbenzene dihydroperoxide than for the other peroxides tested. It is, therefore, apparent that diisopropylbenzene dihydroperoxide is vastly superior as an oxidizing agent in the redox low temperature polymerizations contemplated herein.

The polymerizable starting materials suitable for the present invention are those which are known to be suitable in redox type reactions. As is well known, butadiene-1,3 is the most suitable conjugated diolefin though higher homologues such as pentadiene, hexadiene, etc., may be used up to dodecadiene. Suitable copolymerizable compounds are those containing the olefinic linkage $CH_2=C<$, e. g. acrylic acid derivatives such as acrylonitrile and vinyl aromatic compounds such as styrene.

The following examples are given to demonstrate the superiority of diisopropylbenzene dihydroperoxide as an oxidizing agent in these low temperature polymerizations over the catalysts previously used when the various parametric conditions in the process are changed.

*Example 1*

A series of polymerizations were carried out at 55° F. using the following charge recipe. All the quantities are expressed as parts by weight:

| | |
|---|---|
| Butadiene | 72 |
| Styrene | 28 |
| Sodium fatty acid soap (emulsifier) | 5.0 |
| Mixed tertiary mercaptan | 0.3 |
| Potassium pyrophosphate | 0.133 |
| Ferrous sulfate ($FeSO_4.7H_2O$) | 0.08 |
| Hydroperoxide oxidizing agent | Variable |
| Water | 180 |

The efficiency of the polymerization is conveniently expressed as percentage conversion within a definite time limit. In all the examples quoted herein, the percentage conversion is taken at 17 hours. The percentage of monomers converted to polymer in 17 hours is shown in Table II for various amounts of diisopropylbenzene dihydroperoxide and diisopropylbenzene hydroperoxide:

TABLE II

| Diisopropylbenzene dihydroperoxide | | Diisopropylbenzene hydroperoxide | |
|---|---|---|---|
| Charge (parts by weight) | Percent Conversion in 17 hours | Charge (parts by weight) | Percent Conversion in 17 hours |
| 0.02 | 21 | 0.02 | 5 |
| 0.04 | 83 | 0.04 | 4 |
| 0.06 | 84 | 0.06 | 23 |
| 0.08 | 80 | 0.08 | 27 |
| 0.10 | 72 | 0.10 | 72 |
| 0.14 | 76 | -------- | -------- |
| 0.17 | 77 | -------- | -------- |
| 0.20 | 77 | -------- | -------- |

It can be seen from these results that the dihydroperoxide is a much better oxidizing agent than the monohydroperoxide, especially in concentration ranges of less than 0.10 part by weight of the total charge recipe when a sodium fatty acid soap is used as an emulsifier. Further, this shows that the sodium soap, which is cheaper than the alternative potassium soap, can now be used. Previously, the sodium soap could not be used because it formed a thixatropic gel with prior art oxidizing agents which did not emulsify properly.

*Example 2*

The comparisons of the efficiencies of diisopropylbenzene hydroperoxide and of diisopropylbenzene dihydroperoxide were continued. In this case, the same charge recipe was used as in Example 1 above, except that 5.0 parts potassium fatty acid soap were used as the emulsifier instead of the sodium fatty acid soap. The efficiencies of the two hydroperoxides are given in Table III, which shows the percentage conversion of monomers in 17 hours.

TABLE III

| Diisopropylbenzene dihydroperoxide | | Diisopropylbenzene hydroperoxide | |
|---|---|---|---|
| Charge (Parts by weight) | Percent conversion in 17 hours | Charge (Parts by weight) | Percent conversion in 17 hours |
| 0.01 | 23 | -------- | -------- |
| 0.02 | 90 | 0.02 | 29 |
| 0.04 | 97 | 0.04 | 94 |
| | | 0.06 | 92 |
| 0.20 | 87 | 0.20 | 91 |

This data shows that the dihydroperoxide is a superior oxidizing agent at low concentrations, about 0.02 part by weight, even with the potassium fatty acid soap as an emulsifier.

*Example 3*

It has always been desirable to add an electrolyte, such as potassium sulfate, to the charge recipe in order to make the emulsion less viscous and so aid in the dissipation of heat. However, up to now this involved the disadvantage that the polymerization tended to slow down due to the dissociation of the electrolyte.

A series of polymerizations was carried out using the following charge recipe firstly with diisopropylbenzene dihydroperoxide and then with diisopropylbenzene hydroperoxide as the oxidizing agent, using varying quantities:

| | |
|---|---|
| Butadiene | 72 |
| Styrene | 28 |
| Potassium fatty acid soap (emulsifier) | 5.0 |
| Mixed tertiary mercaptan | 0.3 |
| Potassium pyrophosphate | 0.133 |
| Ferrous sulfate ($FeSO_4.7H_2O$) | 0.08 |
| Potassium sulfate | 1.0 |
| Oxidizing agent | Variable |
| Water | 180 |

The results are summarized in Table IV, which shows the effect on the extent of polymerization of variable amounts of both the monohydroperoxide and dihydroperoxide oxidizing agents.

TABLE IV

| Diisopropylbenzene dihydroperoxide | | Diisopropylbenzene hydroperoxide | |
|---|---|---|---|
| Charge (Parts by weight) | Percent conversion in 17 hours | Charge (Parts by weight) | Percent conversion in 17 hours |
| 0.10 | 81 | 0.10 | 24 |
| 0.20 | 100 | 0.20 | 70 |

These results show that the polymerization, using the dihydroperoxide as the oxidizing agent, is unaffected by the addition of the electrolyte, while the polymerization using the monohydroperoxide as the oxidizing agent is greatly reduced, especially at low concentrations.

*Example 4*

In order to determine the effect of variable amounts of sequestering agent on the copolymerization using diisopropylbenzene dihydroperoxide as the oxidizing agent, a series of copolymerizations were carried out at 55° F.

using the following charge recipe. The amounts are in parts by weight.

| | |
|---|---|
| Butadiene | 64 |
| Acrylonitrile | 36 |
| Nacconol | 3.0 |
| Daxad 11 | 0.6 |
| Trisodium phosphate | 0.5 |
| Mixed tertiary mercaptan | 0.3 |
| Potassium pyrophosphate | Variable |
| Ferrous sulfate ($FeSO_4.7H_2O$) | 0.08 |
| Diisopropylbenzene dihydroperoxide | 0.20 |
| Water | 250 |

Nacconol is an alkyl aryl sulfonate wetting agent manufactured by National Aniline Division, Allied Chemical & Dye Corporation, New York, N. Y.

Daxad 11 is a polymerized sodium salt of alkyl aryl and aryl alky sulfonic acids manufactured by Dewey and Almy Chemica Co., Cambridge, Mass.

The results of these polymerizations are given in Table V.

TABLE V

| Potassium pyrophosphate charge (parts by weight) | Percent Conversion in 17 hours |
|---|---|
| 0.013 | 43 |
| 0.027 | 68 |
| 0.040 | 93 |
| 0.053 | 100 |
| 0.067 | 97 |
| 0.080 | 97 |

This data shows that the conversion attained in 17 hours is practicaly insensitive to variations in the amount of sequestering agent when the amount of sequestering agent is greater than about 0.040 part by weight. Even though the extent of polymerization is low when the sequestering agent concentration is about 0.013 part by weight, yet the reaction rate is increased. It was found that the 43% conversion when 0.013 part sequestering agent was used was accomplished in about 10 hours.

*Example 5*

A series of copolymerizations were carried out similar to those in Example 4 above except that the potassium pyrophosphate charge was fixed at 0.133 part by weight, and varying amounts of the hydroperoxide and dihydroperoxide were used. The results are given in Table VI.

TABLE VI

| Diisopropylbenzene dihydroperoxide | | Diisopropylbenzene hydroperoxide | |
|---|---|---|---|
| Charge (parts by weight) | Percent conversion in 17 hours | Charge (parts by weight) | Percent conversion in 17 hours |
| 0.04 | 100 | 0.04 | 90 |
| 0.08 | 100 | 0.06 | 98 |
| 0.20 | 100 | 0.08 | 95 |
| | | 0.10 | 96 |

This data shows that the yield of polymer is independent of wide variations in the amount of the dihydroperoxide, but is somewhat dependent upon the amount of the monohydroperoxide.

*Example 6*

One of the principal disadvantages in the copolymerization of butadiene and acrylonitrile at low temperature has been that the maximum rate of conversion coincides with the maximum viscosity of the latex. A consequence of this condition is that many of the reactions are uncontrollable since the exothermic heat of reaction cannot be removed rapidly enough from the viscous solution. An indication that the maximum rate of conversion coincides with the maximum viscosity is shown when a plot of the percentage conversion against time is a sigmoidal curve. Butadiene and acrylonitrile were copolymerized according to the recipe of Example 4 with 0.133 part of potassium pyrophosphate and with first 0.10 part diisopropylbenzene dihydroperoxide and then with 0.20 part diisopropylbenzene dihydroperoxide. The copolymerizations were also performed according to Example 4 except that 0.133 part potassium pyrophosphate was used, and also 0.10 part diisopropylbenzene hydroperoxide and 0.04 part $FeSO_4.7H_2O$. The results are shown in Tables VII and VIII.

TABLE VII

| 0.10 part diisopropylbenzene dihydroperoxide | | 0.20 part diisopropylbenzene dihydroperoxide | |
|---|---|---|---|
| Reaction Time (hours) | Percent conversion | Reaction Time (hours) | Percent conversion |
| 1.75 | 5.0 | 5.0 | 19.0 |
| 5.0 | 26.0 | 8.0 | 38.0 |
| 8.0 | 34.0 | 14.0 | 78.0 |
| 14.0 | 70.0 | | |

TABLE VIII

[0.10 part diisopropylbenzene hydroperoxide.]

| Reaction Time (hrs.) | Percent Conversion |
|---|---|
| 3.0 | 8.4 |
| 5.0 | 43.0 |
| 8.0 | 73.8 |
| 11.0 | 83.6 |

If these results are plotted on a graph of percent conversion against reaction time, it will be seen that the polymerizations using the dihydroperoxide give a linear plot, whereas that using monohydroperoxide gives a sigmoidal plot. It is thus evident that the use of the dihydroperoxide results in a controllable polymerization.

It should be mentioned that because diisopropylbenzene dihydroperoxide is a solid at room temperature it must be handled in a different way from some of the previously used hydroperoxides such as diisopropylbenzene hydroperoxide which is a liquid. The method of using the dihydroperoxide of this invention, which may be added either as a powder or as a solution in a non-reactive solvent, e. g. acetone, will be largely dependent upon the polymerization system used.

Seven (7) ounce bottles were used for the polymerization of the above examples. It was found satisfactory to add the dihydroperoxide in suspension in styrene when the latter is the co-monomer. In the case of recipes containing acrylonitrile, it was readily dissolved in a portion of the acrylonitrile just prior to charging it to the bottles. Unless this precaution is taken, the diisopropylbenzene dihydroperoxide reacting with impurities in the acrylonitrile may bring about polymerization of the acrylonitrile before it is charged.

What we claim is:

1. In the process of polymerizing, in an aqueous emulsion, a conjugated diolefin containing from 4 to 12 carbon atoms, the improvement which comprises carrying out the polymerization in the presence of an iron salt and p-diisopropylbenzene dihydroperoxide, said dihydroperoxide being present in an amount between about 0.01 and 0.4 part by weight based on said diolefin.

2. In the process of copolymerizing, in an aqueous emulsion, a conjugated diolefin containing from 4 to 12 carbon atoms and a compound copolymerizable therewith containing the olefinic linkage $CH_2=C<$, the improvement which comprises carrying out the copolymerization in the presence of an iron salt and p-diisopropylbenzene dihydroperoxide, said dihydroperoxide being present in an amount between about 0.01 and 0.4 part by weight based on the polymerizable compounds.

3. The process as claimed in claim 1 in which said conjugated diolefin is butadiene-1,3.

4. The process as claimed in claim 2 in which said conjugated diolefin is butadiene-1,3.

5. In the process of copolymerizing, in an aqueous emulsion, butadiene-1,3 and a copolymerizable compound selected from the group consisting of vinyl aromatic compounds and derivatives of acrylic acid, the improvement which comprises carrying out the polymerization in the presence of an iron salt and p-diisopropylbenzene dihydroperoxide, said dihydroperoxide being present in an amount between about 0.01 and 0.4 part by weight based on the polymerizable compounds.

6. In the process of copolymerizing butadiene-1,3 and styrene in an aqueous emulsion the improvement which comprises carrying out the polymerization in the presence of an iron salt and p-diisopropylbenzene dihydroperoxide, said dihydroperoxide being present in an amount between 0.01 and 0.4 part by weight based on the polymerizable compounds.

7. In the process of copolymerizing butadiene-1,3- and acrylonitrile in an aqueous emulsion the improvement which comprises carrying out the polymerization in the presence of an iron salt and p-diisopropylbenzene dihydroperoxide, said dihydroperoxide being present in an amount between 0.01 and 0.4 part by weight based on the polymerizable compounds.

References Cited in the file of this patent
UNITED STATES PATENTS

| | | |
|---|---|---|
| 2,664,447 | Lorand et al. | Dec. 29, 1953 |
| 2,665,269 | Reynolds et al. | Jan. 5, 1954 |